United States Patent
Brown

(10) Patent No.: US 11,263,630 B2
(45) Date of Patent: Mar. 1, 2022

(54) METHOD AND SYSTEM FOR SINGLE PURPOSE PUBLIC KEYS FOR PUBLIC LEDGERS

(71) Applicant: Certicom Corp., Mississauga (CA)

(72) Inventor: Daniel Richard L. Brown, Mississauga (CA)

(73) Assignee: BlackBerry Limited, Waterloo (CA)

( * ) Notice: Subject to any disclaimer, the term of this patent is extended or adjusted under 35 U.S.C. 154(b) by 278 days.

(21) Appl. No.: 16/158,971

(22) Filed: Oct. 12, 2018

(65) Prior Publication Data

US 2020/0118130 A1    Apr. 16, 2020

(51) Int. Cl.
| | |
|---|---|
| *G06Q 20/40* | (2012.01) |
| *G06Q 20/06* | (2012.01) |
| *G06Q 20/38* | (2012.01) |
| *H04L 9/08* | (2006.01) |
| *H04L 9/00* | (2022.01) |
| *H04L 9/32* | (2006.01) |

(52) U.S. Cl.
CPC ....... *G06Q 20/4014* (2013.01); *G06Q 20/065* (2013.01); *G06Q 20/3821* (2013.01); *G06Q 20/3829* (2013.01); *G06Q 20/405* (2013.01); *G06Q 20/40145* (2013.01); *H04L 9/006* (2013.01); *H04L 9/0866* (2013.01); *H04L 9/321* (2013.01); *H04L 9/3247* (2013.01); *H04L 9/3263* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 6,792,530 | B1 | 9/2004 | Qu et al. |
| 8,069,346 | B2 | 11/2011 | Struik |
| 8,447,971 | B2 | 5/2013 | Campagna et al. |
| 8,457,307 | B2 | 6/2013 | Vanstone |
| 8,560,449 | B1 * | 10/2013 | Sears .................. G06Q 20/405 705/42 |
| 9,240,884 | B2 | 1/2016 | Brown |

(Continued)

FOREIGN PATENT DOCUMENTS

| | | |
|---|---|---|
| CN | 107240017 A | 10/2017 |
| CN | 108021821 A | 5/2018 |
| WO | 2017044554 A1 | 3/2017 |

OTHER PUBLICATIONS

Y. Liu et al., "An efficient method to enhance Bitcoin wallet security," 2017 11th IEEE International Conference on Anti-counterfeiting, Security, and Identification (ASID), Xiamen, 2017, pp. 26-29, doi: 10.1109/ICASID.2017.8285737. (Year: 2017).*

(Continued)

*Primary Examiner* — Jacob C. Coppola
(74) *Attorney, Agent, or Firm* — Moffat & Co

(57) ABSTRACT

A method at a computing device in a public ledger cryptography system, the method including creating a purpose string, the purpose string defining transaction parameters for an account within the public ledger cryptography system; using the purpose string to create a private key and associated public key for an account within the public ledger cryptography system; and providing the purpose string for use in verification of a transaction from the account within the public ledger cryptography system.

19 Claims, 5 Drawing Sheets

(56) References Cited

U.S. PATENT DOCUMENTS

| | | | |
|---|---|---|---|
| 11,070,378 B1* | 7/2021 | Griffin | H04L 9/3297 |
| 2002/0029337 A1 | 3/2002 | Sudia et al. | |
| 2002/0073045 A1* | 6/2002 | Rubin | G06Q 20/385 |
| | | | 705/65 |
| 2005/0097037 A1 | 5/2005 | Tibor | |
| 2009/0281937 A1 | 11/2009 | Gupta et al. | |
| 2012/0209772 A1* | 8/2012 | Nuzzi | G06Q 20/405 |
| | | | 705/44 |
| 2013/0290184 A1* | 10/2013 | Shapiro | G06Q 20/405 |
| | | | 705/44 |
| 2014/0081857 A1 | 3/2014 | Bonalle et al. | |
| 2014/0250003 A1 | 9/2014 | Levchin et al. | |
| 2015/0254699 A1 | 9/2015 | Bondesen et al. | |
| 2015/0332283 A1 | 11/2015 | Witchey | |
| 2016/0253663 A1 | 9/2016 | Clark et al. | |
| 2016/0261411 A1 | 9/2016 | Yau et al. | |
| 2016/0292672 A1 | 10/2016 | Fay et al. | |
| 2017/0085562 A1 | 3/2017 | Schultz et al. | |
| 2017/0180128 A1 | 6/2017 | Lu | |
| 2017/0317833 A1 | 11/2017 | Smith et al. | |
| 2020/0042958 A1* | 2/2020 | Soundararajan | G06Q 20/3829 |

OTHER PUBLICATIONS

Patent Cooperation Treaty, International Search Report for International Application No. PCT/CA2019/051439 dated Nov. 29, 2019 (7 pages).

Patent Cooperation Treaty, Written Opinion of the International Searching Authority for International Application No. PCT/CA2019/051439 dated Nov. 29, 2019 (6 pages).

Daniel R. L. Brown, Certicom Corp., "Standards for Efficient Cryptography—SEC 1: Elliptic Curve Cryptography", Version 2.0, May 21, 2009.

Matthew Campagna, Certicom Corp., "Standards for Efficient Cryptography—SEC 4: Elliptic Curve Qu-Vanstone Implicit Certificate Scheme (ECQV)", Version 1.0, Jan. 24, 2013.

Extended European Search Report, EP Application No. 19871914.8, dated Aug. 12, 2021.

\* cited by examiner

METHOD AND SYSTEM FOR SINGLE PURPOSE PUBLIC KEYS FOR PUBLIC LEDGERS

FIELD OF THE DISCLOSURE

The present disclosure relates to public ledgers including blockchain, and in particular relates to transaction security for public ledgers.

BACKGROUND

Banking is usually based on a ledger system. A ledger is a record of transactions between accounts. A public ledger makes the ledger public in the sense that all transactions are available to the public. Further, a public ledger system is pseudonymous if the account numbers are traceable, but do not identify individuals by name. Pseudonymous, as used herein, means that the while transactions associated with an account number can be traced, the account numbers themselves cannot necessarily be associated with a particular person.

A public ledger cryptocurrency is a digital currency that uses cryptography to mark transactions. In such systems, an account number may be a public key, and a transaction may contain a digital signature. The public ledger can be used by a cryptocurrency recipient to confirm that the account holder has enough funds in an account before entering into a transaction. This may help to avoid a double spending by a cryptocurrency sender.

In public ledger cryptography systems, each account holder normally has a private key, which is used to sign transactions. The private key is often stored in a module called a digital wallet on a computing device. However, a thief may invade the device storing the digital wallet and extract an account holder's private signing key. The thief can then transfer funds of the account holder into other accounts.

An honest recipient would not like to receive stolen funds. In cryptocurrency, every recipient should first inspect the public ledger to see if the said sender possesses sufficient funds. This inspection of the public ledger gives an honest recipient a limited opportunity to counter some forms of theft and fraud. In particular, the checking of the public ledger may allow an honest recipient to trace where funds have travelled. An honest recipient may be able to detect that the cryptocurrency in question has followed a suspicious path. For example, if the funds originate from an account whose funds have been reported stolen, and honest recipient can refuse to receive the funds and may report an attempted transaction to authorities.

However, significant problems exist with such methods. In particular, there is no way for an honest recipient to avoid receiving funds before the funds' true owner has detected a stolen digital wallet. Further, there is no way for an honest recipient to validate whether a stranger is a rightful owner of the funds. Thus, there is little defense against, for example, fraud-based money laundering. This lack of defense undermines the credibility of the entire public ledger.

BRIEF DESCRIPTION OF THE DRAWINGS

The present disclosure will be better understood with reference to the drawings, in which.

DETAILED DESCRIPTION OF THE DRAWINGS

Figure 1:
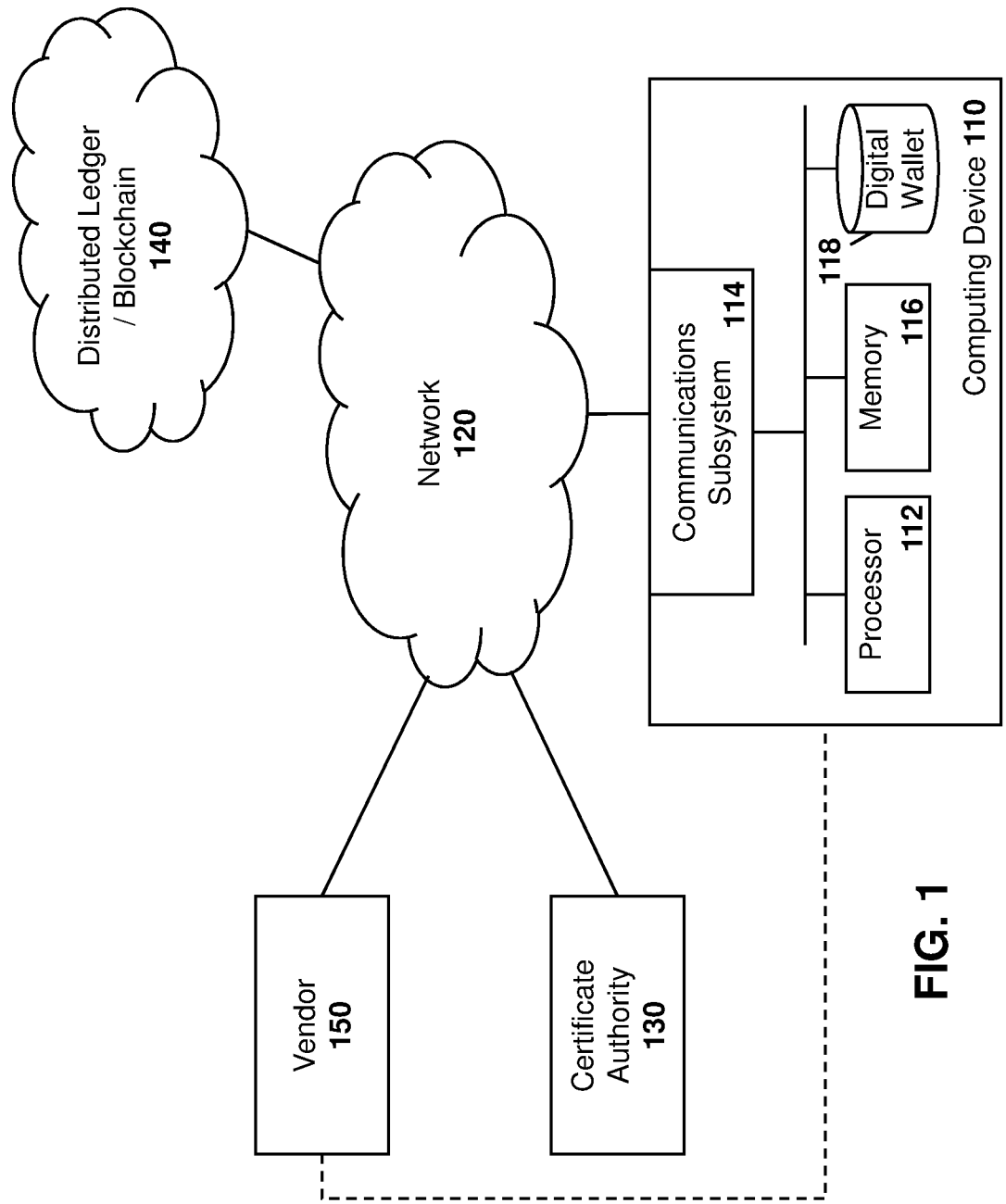
FIG. 1 is a block diagram of an example computing system that can be used for public ledger cryptography transactions.

The present disclosure provides a method at a computing device in a public ledger cryptography system, the method comprising: creating a purpose string, the purpose string defining transaction parameters for an account within the public ledger cryptography system; using the purpose string to create a private key and associated public key for an account within the public ledger cryptography system; and providing the purpose string for use in verification of a transaction from the account within the public ledger cryptography system.

The present disclosure further provides a computing device in a public ledger cryptography system, the computing device comprising: a processor; and a communications subsystem, wherein the computing device is configured to: create a purpose string, the purpose string defining transaction parameters for an account within the public ledger cryptography system; use the purpose string to create a private key and associated public key for an account within the public ledger cryptography system; and provide the purpose string for use in verification of a transaction from the account within the public ledger cryptography system.

The present disclosure further provides a computer readable medium for storing instruction code which, when executed by a processor of a computing device in a public ledger cryptography system, cause the computing device to: create a purpose string, the purpose string defining transaction parameters for an account within the public ledger cryptography system; use the purpose string to create a private key and associated public key for an account within the public ledger cryptography system; and provide the purpose string for use in verification of a transaction from the account within the public ledger cryptography system.

In accordance with the present disclosure, the terminology in Table 1 will be used.

TABLE 1

Terminology

| Term | Brief Description |
| --- | --- |
| Ledger | A list of transactions/money transfers between accounts |
| Public ledger | A ledger which is publicly viewable |
| Pseudonym or account address | A unique traceable number attached to an account: usually also a public key |
| Public key | A value used to verify a digital signature of a message, for each public key, there is an associated private key |
| Digital signature | A value that is a publicly verifiable value, given a message and a public key |

TABLE 1-continued

Terminology

| Term | Brief Description |
|---|---|
| Private key | A value used to generate a digital signature of message - for each private key, there is an associated public key |
| Proof of generation | Proof that an entity generated a public key - more precisely that public key was generated in combination with a particular message, called the purpose string in this disclosure. The entity may publicly identify the particular message used for the public key generation. |
| Purpose string | A message that can be used to create a mutually associated pair of keys, a private key and a public key, such that each public key can have at most 1 purpose string |

As provided in Table 1, a public ledger is a ledger which is publicly viewable. One example of a public ledger cryptocurrency is Bitcoin, which uses blockchain technology to authenticate the public ledger. This process is known as mining, and mostly decentralizes the authority of the public ledger.

In accordance with embodiments of the present disclosure, a public ledger cryptography system is described. The public ledger may, for example, be used for cryptocurrency. The cryptocurrency used with the embodiments herein may be, for example, Bitcoin. However, the present disclosure is not limited to Bitcoin and any suitable cryptocurrency may be used.

Cryptocurrency may be used in a variety of computing environments. One example computing environment is shown with regard to FIG. 1.

In the embodiment of FIG. 1, a computing device 110 belongs to a user with funds on a public ledger. In this regard, computing device 110 may include a processor 112 and a communications subsystem 114, where the processor and communications subsystem cooperate to perform the methods described herein.

Computing device 110 may further include a memory 116, which may be used to store the data or programmable logic. The programmable logic may be executed by processor 112. In other embodiments, programmable logic may be provided to computing device 110 through communications subsystem 114.

In the computing system of FIG. 1, the computing device 110 includes a digital wallet 118, which may store the private key for funds within the public ledger. In particular, the public key for the user of computing device 110 associated with the private key stored in digital wallet 118 may allow for the funds to be used with the public ledger. The private key is stored in the digital wallet 118, which provides for security to store such private key.

Digital wallet 118 may be any data structure or logical structure used to store the private key and associated data. In some embodiments, digital wallet 118 is implemented in software and hardware, or may be implemented in specifically designed hardware, that stores information that allows an individual to make electronic commerce transactions. In some embodiments, the digital wallet may be provided utilizing dedicated hardware devices, such as a hardware security module. In other embodiments, the digital wallet 118 may include memory that is dedicated to the digital wallet, and may be internal or external to computing device 110.

Computing device 110 may communicate, for example, through a network 120.

In some embodiments, computing device 110 may communicate with a certificate authority 130 which may be used to generate and authenticate certificates for the computing device, including certificates for the public ledger in some cases.

Further, network 120 may be used for computing device 110 to communicate with a public ledger or block chain 140, which may be stored on a plurality of computers and be distributed in some cases.

Further, in some embodiments, network 120 may be used to communicate with a receiving entity such as a vendor 150. Vendor 150 may include a computing device configured to perform the embodiments herein, including communication with computing device 110 and the public ledger/blockchain 140, as well as verification as described below.

The vendor 150 may be providing goods or services in exchange for the cryptocurrency associated with digital wallet 118.

However, in some embodiments, computing device 110 may be proximate to a vendor 150 and in this case communication directly between the computing device 110 and vendor 150 is possible.

As indicated above, due to the nature of the public ledger, fraud detection may be possible to a certain degree. Suspicious transactions can be detected, for example, from suspicious activities. For example, large value transactions, sudden transactions, purchases towards suspicious vendors, or purchases made in unusual locations might serve as indicators of fraudulent transactions. The credit card industry already uses such measures to block suspicious credit card transactions, or to request further information before allowing suspicious transactions to move forward.

In Bitcoin, a recommended response to suspected theft of a private key from a digital wallet is to first create a new account with a new public key, and next transfer remaining funds (if any) to the new account. However, at this point, it may already be too late, the attacker may have already transferred out the funds to another account.

Bitcoin itself does not provide any means to issue a theft report. There is no current mechanism within the public ledger to flag stolen Bitcoins. Nonetheless, it is possible to do so outside of the public ledger mechanism, such as on social media, by contacting government authorities, among other options. Once such reporting has been performed, a path of the stolen funds through the ledger can be traced.

In a public ledger, an honest vendor can examine suspicious transactions or use theft reports to detect fraudulent transactions. An honest vendor can therefore refuse to enter into new transactions that would that they believe may involve stolen funds or be otherwise fraudulent. The honest vendor can even review or trace through past transactions to measure what percentage of funds in an account are suspicious or fraudulent.

A thief's efforts to circumvent the fraud detection system is called laundering. As a first step of laundering, a thief may transfer a large amount of the victim's funds to his or her own account. The thief would then try to spend this amount before the victim issues a theft report (which flags the funds in the thief's account as stolen). A fraud detection system may therefore be designed to suspect funds spent too soon after a large transfer.

A thief might also try to make many small transfers in a short amount of time to multiple accounts. This type of activity may again be flagged as suspicious.

In cases of high-value theft or fraud, authorities may attempt to physically apprehend the people spending the funds, for example, by offering to make a personal transaction with the thief.

However, in all such cases, previous knowledge of transactions and in some cases knowledge that the funds are stolen is needed.

Therefore, in accordance with the embodiments of the present disclosure described below, a concept entitled "Proof of Generation" may be utilized with public keys to provide a "purpose string" for transaction verification.

Proof of generation allows for the binding of a message to a public key. The public key can then be verified against the message to ensure the public key is associated with the message. This is, for example, described in U.S. Pat. No. 9,240,884, Jan. 19, 2016, to Brown.

In particular, proof of generation is used to generate a public key with an attached message. Typically, using proof of generation, when the public key is generated, a message is bound to the public key. The binding of this message to the public key can be verified by anybody.

Furthermore, the binding is unique, in that it is impossible to have two different messages bound to a public key. Even a malicious entity generating the private key and public key cannot create two different messages bound to the same public key.

A public key with a proof of generation message can be used just like any public key and has no limitations other than being bound to a single proof of generation message. For example, a proof of generation public key can be used for digital signatures and for key exchange, or for any other kind of public key cryptography.

In the above, when referring to binding, proof of generation allows for each public key to be bound to one message. However, this does not mean a one to one binding. One message can be bound to many different public keys.

Proof of generation can be either authenticated or unauthenticated, as explained below.

In unauthenticated proof of generation, the bound message is unauthenticated. In particular, there is nothing to stop someone from creating another public key bound to the same message.

In authenticated proof of generation, the bound message is in some way authenticated. For example, the bound message can contain a digital signature of a certification authority, or some other trusted party. For example, for implicit certificates described in Standards for Efficient Cryptography 4 (SEC 4), the proof of generation is authenticated due to the participation of the certification authority.

If used with the embodiments of the present disclosure, a public key can be reconstructed from implicit certificates. Further, anybody can create an implicit certificate, from which a public key can be reconstructed. However, the only way someone can know the private key for a reconstructed public key is if they participated with the certification authority in the creation of the public/private key pair. Therefore, for implicit certificates to provide full security, including proof of generation, the owner of the reconstructed public key must somehow prove possession of the corresponding private key. This proof of possession is typically demonstrated by signing a message or decrypting a ciphertext. In the context of proof of generation, the proof of generation is not completed until the proof of possession is provided. Up until proof of possession, the security is deemed implicit. This means it is usually relatively safe to use the implicit certificate even before proof possession is received, because if the implicit certificate is fake, it will be useless with an unknown private key. Specifically, at some point in the transaction the private key will need to be used for proof of possession, and therefore use of the implicit certificate can be made prior to the proof of possession, since a fake certificate will eventually be detected.

In the context of public ledger cryptocurrency, one of the main ways public keys are used is to verify signatures, which provides proof of possession. Therefore, in accordance with the embodiments described below, the phase of implicit security will not be bypassed since proof of possession can still be used with the methods and systems described herein.

Figure 2:
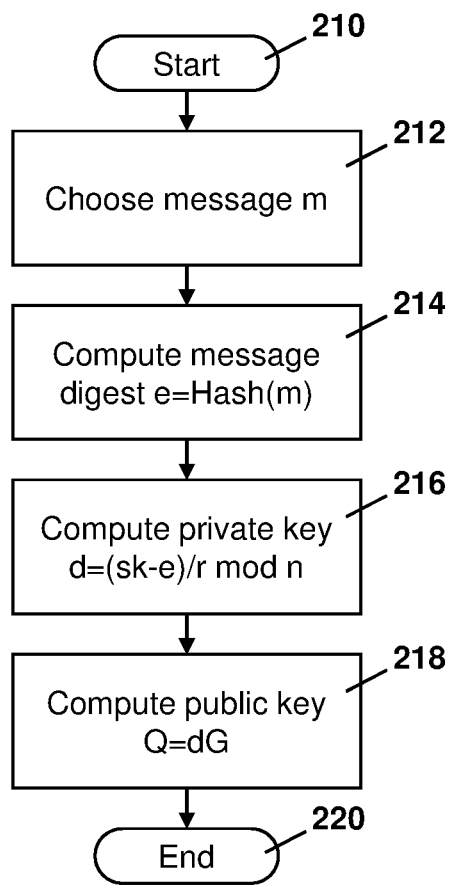
FIG. 2 is a process diagram showing a process for creation of public and private keys tied to a message in an Elliptic Curve Digital Signature Algorithm.

For example, reference is now made to FIG. 2, which shows a method for generating public and private keys utilizing a message m in an Elliptic Curve Digital Signature Algorithm (ECDSA).

The process of FIG. 2 starts at block 210 and proceeds to block 212 in which a message is chosen. As will be appreciated by those in the art, the message could be anything. In particular, in accordance with the embodiments described below, the message may be a purpose string indicating the purpose of the cryptocurrency account.

The process then proceeds to block 214 in which a message digest e is calculated using a hash function on message m. In this case, the function hash is a cryptographic hash function that gives an integer result.

The correspondent may then compute a private key from the message digest e using a formula $d=(sk-e)/r \bmod n$ at block 216. In this case, s is an integer in the interval $[0, n-1]$, and is preferably random. The value k is an integer chosen at random in the interval $[0, n-1]$. The value n is the size of the field for the cryptography. The value r is an integer value corresponding to an elliptic curve point R, where R is referred to as the signature ephemeral public key and k is referred to as the ephemeral private key.

The process of FIG. 2 then proceeds to block 218 in which a public key Q is computed using the formula $Q=dG$, where G is a point of order n on an elliptic curve.

In this way, a public key Q and a private key d are tied to a message m. Such public and private keys can then be used for a public ledger cryptography system.

Figure 3:
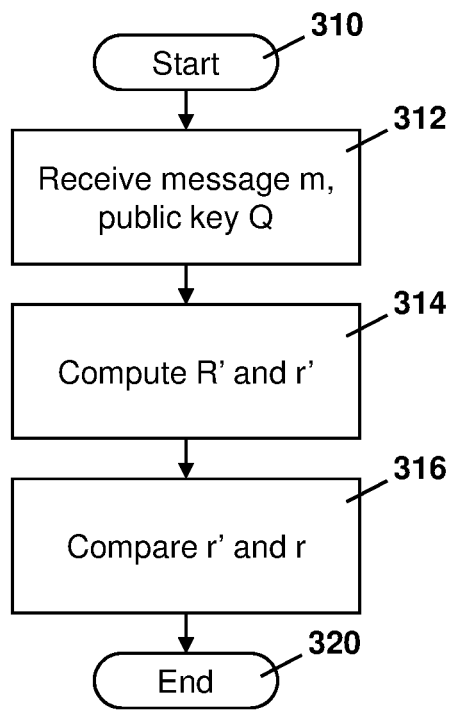
FIG. 3 is a process diagram showing a process for verification that a message is tied to a public key.

On receiving a public key, a computing device may verify that the public key is generated based on the message m. In particular, reference is now made to FIG. 3. In the embodiment of FIG. 3, the process starts at block 310 and proceeds to block 312 in which the verifying computing device receives the public key Q and the message m.

The process then proceeds to block 314. At block 314, the verifier first computes an elliptic curve point $R'=(1/s \bmod n)(eG+rQ)$, which is part of the ECDSA verification process.

The verifier will also need to know how the signature ephemeral public key R was converted to integer value r. This may involve knowing the salt value A, along with the hash function or other function used to compute r. For example, if $r=\text{Hash}(A\|R\|A\|R\| \ldots \|A\|R)$ then r' can be computed as $r'=\text{Hash}(A\|R'\|A\|R'\| \ldots \|A\|R')$.

The verifier could then compare r' and r at block 316, and if the two match, this indicates that the public key was generated using the message m.

Of the process then proceeds to block 320 and ends.

Figure 4:
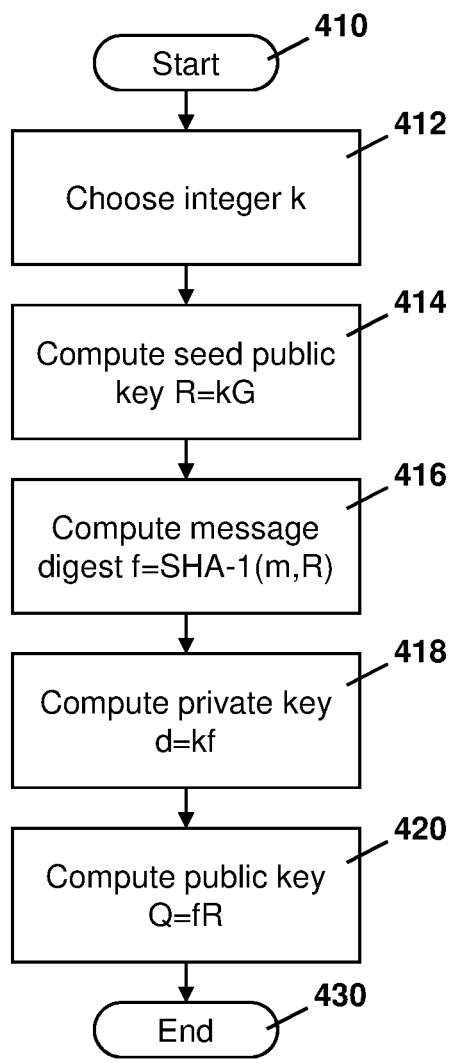
FIG. 4 is a process diagram showing a generalized process for creation of public and private keys tied to a message.

In another embodiment, shown with FIG. 4, a more general method which does not necessarily use elliptic curve cryptography is provided. In particular, the process of FIG. 4 starts at block 410 and proceeds to block 412 in which an integer value k is selected. The value k is an integer in the range $[0, n-1]$.

The process then proceeds to block 414 in which a seed public key R is generated using the formula R=kG, where G is again a point of order n on a curve.

From block 414, the message digest f is computed as f=SHA-1 (m,R) at block 416.

From block 416 the process proceeds to block 418 in which in which the private key d=kf is computed.

The process then proceeds to block 420 in which the public key Q=fR is computed.

The process then proceeds to block 430 and ends.

Such public and private keys can then be used for a public ledger cryptography system.

Figure 5:
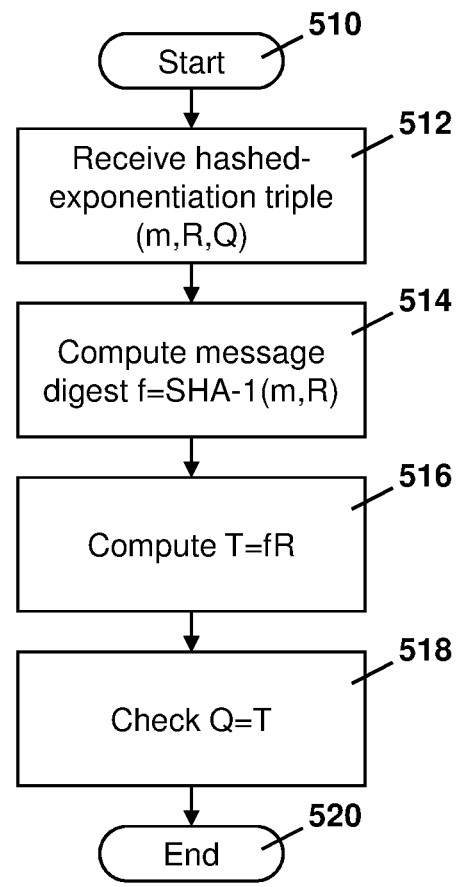
FIG. 5 is a process diagram showing a process for verification that a message is tied to a public key.

A verifier can verify that the public key is bound to the message m utilizing the process of FIG. 5. In particular, the process of FIG. 5 starts at block 510 and proceeds to block 512 in which the verifier receives a hashed exponential triple (m,R,Q).

The process then proceeds to block 514 in which a message digest f=SHA-1 (m,R) is computed.

The process then proceeds to block 516 in which a value T is computed as T=fR.

The process then proceeds to block 518 in which a verifier may check that Q=T If yes, then the public key is bound to the message.

The process then proceeds to block 520 and ends.

Utilizing this concept, the embodiments below include a "purpose string" that is used as part of the message to generate the public key. In particular, a purpose string identifies the purpose of the account within the public ledger.

An honest recipient of funds can ask an alleged account holder for the purpose string in some cases. In other cases, the purpose string may be volunteered by the alleged account holder. In still further cases, the purpose string may be made available through a public database, or through the ledger itself.

An honest recipient will then try to honor the purpose string and try to ensure that the account is used only for the designated purpose.

This may deter or prevent a thief who has stolen the private key for an account to use funds for a wrong purpose.

Thus, the purpose string is used as a prevention against fraud and is set at the time the account is created, prior to any fraud occurring.

Therefore, in accordance with the embodiments of the present disclosure, proof of generation is used to provide a purpose for the account. The purpose may then be verified during a transaction on the public ledger.

As described above, in proof of generation, once a public key is generated, it is bound to a unique message. The binding can be verified by anybody. In all other respects, the public key is normal and can be used to generate digital signatures of arbitrarily many messages, as used in cryptocurrency.

Therefore, in accordance with the embodiments herein, the message to which a public key is bound is re-designated to be a purpose string.

The purpose string can include arbitrary data. Specific content of the purpose string is discussed below.

In the embodiments herein, a process is provided on how to use a purpose string in the context of cryptocurrency. When an alleged public key owner Alice uses her public key with another honest party Bob, the other party Bob can request to see the purpose string. Alice can then provide the purpose string and Bob can inspect the purpose string. Bob honors the purpose string, ensuring the transaction conforms to the details contained in the purpose string.

If the alleged party Alice fails to supply the purpose string, or the alleged Alice or the transaction nature in some ways fails to comply with the purpose string, Bob can refuse to enter the transaction. In so refusing the transaction, Alice cannot obtain any goods or services from Bob.

If an adversary Eve has stolen Alice's private key and is attempting to fraudulently impersonate Alice, then Bob may have thwarted Eve's attempts to profit from the theft of Alice's private keys.

One key property of the purpose string is that there can be at most one purpose string per public key. This property is a consequence of the proof generation method as described above. It is infeasible to generate the same public key with two different purpose strings.

Several properties of the purpose strings are clarified herein. In particular:
  The purpose string does not reveal the private key.
  The public key does not reveal the purpose string.
  The purpose string is not required to be secret.
  The purpose string can be kept private between Alice and Bob, if desired.
  The purpose string can be kept public, such as in a public database, perhaps integrated into the public ledger.
  A public key can be used without a purpose string.
  A dishonest recipient of the purpose string can choose to ignore its purpose, or to not ask for purpose string at all.
  The purpose string, if originated from an unauthenticated proof-of-generation method, can be common to many different public key, so does not establish uniqueness of the public key
  The purpose string does provide a way to identify a unique purpose for a given public key.

In a cryptocurrency, an honest public key owner can create to their public key with an honest purpose string. Honest recipients can request the purpose string, on demand, and only accept transactions with a public key if the transactions comply with the content found in the purpose string.

Figure 6:
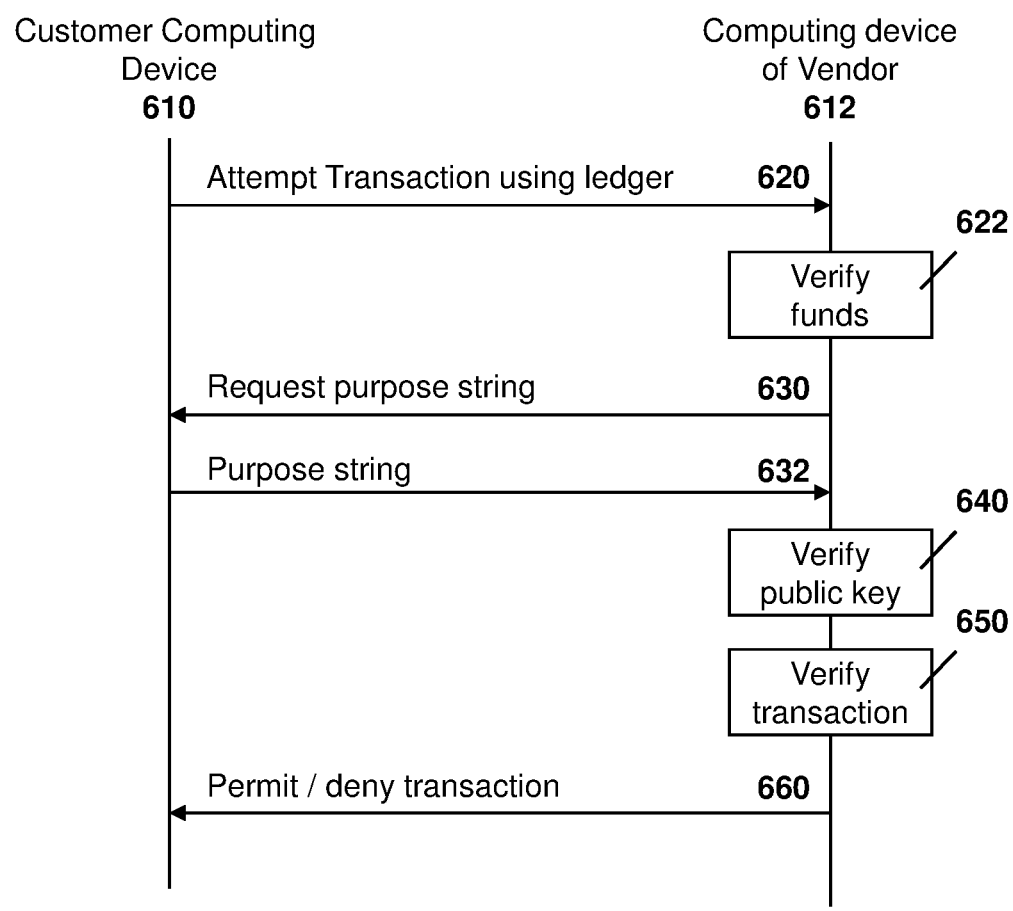
FIG. 6 is a dataflow diagram showing the use of a purpose string to vet a transaction in a public ledger cryptography system.

Therefore, reference is now made to FIG. 6. In the embodiment of FIG. 6, a customer computing device 610 having a digital wallet associated with a public ledger cryptocurrency can attempt to purchase goods or services from a vendor 612.

In this regard, the customer computing device 610 may attempt the transaction using a public ledger, as shown with message 620 between the customer and vendor 612. Message 620 may be sent, for example, over a network, or may be based on a short-range communication between the customer computing device 610 and a computing device for the vendor 612.

The vendor 612 may then verify that the customer associated with computing device 610 has sufficient funds, as shown at block 622. The verification at block 622 may query the ledger to ensure that sufficient funds are associated with customer 610.

Assuming that there are sufficient funds, the computing device of vendor 612 may then request the purpose string for the account, as shown with message 630. Message 630 in the embodiment of FIG. 4 is sent to the customer computing device 610.

In alternative embodiments, rather than requesting the purpose string from customer computing device 610, the computing device of vendor 612 may request the purpose string from the ledger. In other embodiments, the computing device of vendor 612 may request the purpose string from other databases that may contain such purpose string.

In response to the request for the purpose string in message 630, a purpose string may be provided to the computing device of vendor 612 in message 632. Message 632, in the embodiment of FIG. 6, originates from customer computing device 610. However, if the request for the purpose string message 630 went to a different computing device, then message 632 may come from that different computing device.

The computing device of vendor 612 may then verify that the public key associated with the customer, as shown at block 640. The verification may be done in accordance with FIG. 3 or FIG. 5 above, for example. This ensures that the public key is associated with the purpose string that was provided in message 632.

If the public key is verified to be associated with the purpose string, then the computing device of vendor 612 may attempt to verify the transaction at block 650. Verifying the transaction means that the transaction falls within the boundaries of the purpose string.

The vendor may then permit or deny the transaction, as shown with message 660. The permitting or denying may be done automatically at a computing device in some embodiments. In the other embodiments, the permitting or denying may be based on user input to a computing device based on information presented at the computing device.

As will be appreciated by those in the art, if the public key is not associated with the purpose string that was provided in message 632, then a message 660 may be sent immediately after block 640, denying the transaction.

As indicated above for block 650, the transaction may be verified against the purpose string. There are various options for such verification.

In a first option, various transaction limitations may be placed within the purpose string. For example, in one embodiment, the purpose string may contain information that limits what type of transactions are allowed for the account.

In setting up the account, the account holder can limit the maximum amount or value of a single transfer, for example. The holder can also limit the total number of transfers in a given time period, such as per day.

An honest recipient to can therefore check the purpose string at block 650 and honor these limitations. In particular, the computing device of vendor 612 may refer to the public ledger to see how many transactions have occurred from such account and see whether the current transaction would exceed the transaction limit within the purpose string.

In other cases, the computing device of vendor 612 may verify that the amount of the transfer proposed is below the value in the purpose string.

In some cases, the purpose string may have a specific format which would facilitate the parsing of the purpose string by a computing device associated with the vendor 612, thereby enabling the computing device to perform the verification at block 640. In other cases, natural language processing may be utilized to find limitations within the purpose string.

Therefore, the purpose string may provide a way to add transaction limitations to public ledger cryptocurrency.

The purpose string may also be used to limit the type of items which the funds can be used to purchase. For example, the funds may be limited to only being used for purchasing groceries. Such limitation can make it less efficient for a thief to launder stolen funds, because the stolen funds would have to be exchanged for something that is more difficult to resell, is bulkier, and has a short shelf life, thereby losing value quickly.

Again, the types of goods or services for which transactions are limited may have standardized text to allow for the parsing of the such purpose string in some cases. In other cases, natural language processing could be utilized.

In still further instances, the purpose string may only permit a transaction when the account holder is physically present and not on-online.

In other cases, the purpose string may limit transactions during a certain time window. For example, transactions may be limited to between 7 am and 9 pm Eastern Standard Time. Therefore, if an attempt is made to purchase something from a vendor outside of the specified time window then the transaction may be denied.

In further embodiments, the purpose string may contain geographic boundaries for where the transaction can occur. Therefore, the funds may only be used within the such geographic area, such as a city, province, state or country.

In other cases, the transaction may be required to be performed in a public place. Therefore, a positioning system associated with the computing device of the vendor 612 may determine whether the device is in a public space or private space and therefore allow or deny the transaction.

Other options are possible.

Further, in some cases, the purpose string may be limited to only one of the above purposes. In other cases, the purpose string can contain multiple limitations. Therefore, the purpose string may indicate that a transaction limit of $1000 per transaction can occur only between 7 am and 9 pm Eastern Standard Time. The number or types of purposes is not limited for a purpose string.

In still further embodiments, the purpose string may contain an identifier for a customer. In particular, in this embodiment, the purpose string includes data that can be used to identify the true account holder. The data may be in a form that allows the honest recipient to verify the identification.

While in many cryptocurrencies, account holders are pseudonymous, or even anonymous, a purpose string with an identifier partially reverts this pseudonymous property. The loss of pseudonymity has some disadvantages, such as weaker privacy, such disadvantages may be offset by the protections or disincentives against digital wallet theft.

For example, in one case, the purpose string may provide the name of the true account holder, in text form. In this case, an honest vendor may have some means to verify the name of the person attempting to perform the transaction. In some cases, the vendor may know the account holder, for example through a pre-existing relationship. In other cases, the honest recipient or vendor may request to see other authenticated forms of identification, such as a driver's license or passport. The honest recipient may check the name on the official document to find whether it matches the name in the purpose string. The strength of identification depends on the strength of the official document or existing relationship.

In yet another embodiment, the purpose sting may be data that provides biometric data such as an image of the true account holder. In this case, the honest recipient may compare the image in the purpose string to an image of the alleged account holder. For example, this may be used when transactions are done in person, or using a webcam, among other options.

In further embodiments, rather than an image, other identifying and hard to fake information could be used. This could include, for example, biometric data such as a fingerprint, voice pattern, among other options.

Similarly, the purpose string may contain an image of an account holders driver's license. This might include an image of the true account holder, the handwritten signature of the holder, among other information. This information can then be matched against the actual driver's license, as well as a direct image of the alleged account holder and the alleged account holder's signature.

In yet another embodiment, which may be suitable for online transactions, is if the purpose string is authenticated by a certification authority. For example, the underlying proof of generation method could be an implicit certificate, or the purpose could contain a message similar to a traditional public key certificate. As usual, the certification authority verifies the identity of the true account holder at the time of the account creation. However, in the situation where a thief that has stone the private key, it is likely that the purely digital information that is usually used for authentication might have been compromised. To get around this threat, in an online setting, one might be able to simulate the retail environment, such as providing a video connection between the honest recipient and the alleged account holder. In this video connection, the honest recipient can use the various image-based methods described above to attempt to verify the identity.

An honest recipient may verify an entity to different degrees. In some cases, the vetting of the alleged account holder may be proportional to the risk level of the transaction.

Therefore, in accordance with the embodiments described above, one or more purpose strings may be embedded in the message that is used to generate a public key. The use of such purpose string may then allow a recipient to screen a transaction prior to allowing the transaction to proceed.

It will be appreciated by those skilled in the art that the use of a purpose string in the generation of the public and private keys associated with public ledger cryptography does not limit other cryptographic functions for such keys or ledgers. For example, use of a certificate authority to check that a key belongs to an owner is not changed by the use of a purpose string. Similarly, public key infrastructure (PKI) functionality for key exchange is not affected by the use of purpose strings.

The modules and user equipments and devices performing the methods described above may be any electronic device or network node. Such computing device or network node may include any type of computing device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

For example, the computing device may be associated with an owner of a public ledger account or associated with a transaction recipient. One simplified diagram of a computing device is shown with regard to FIG. 7.

Figure 7:
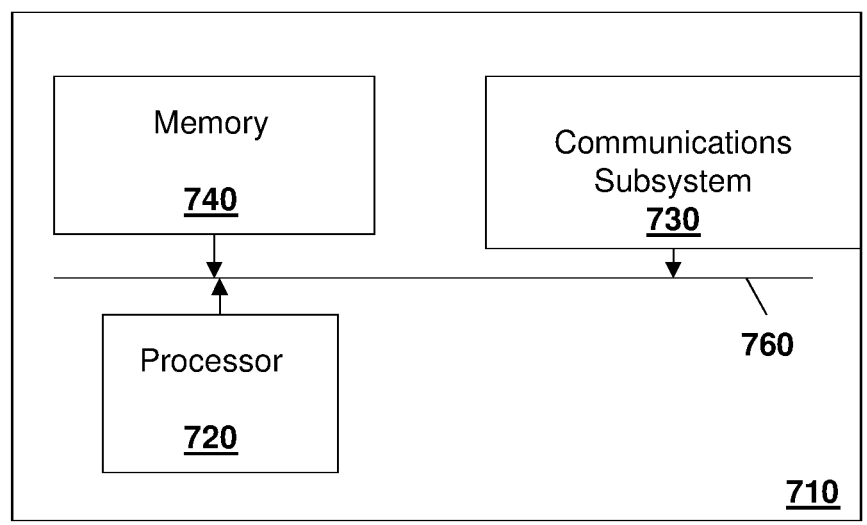
FIG. 7 is a block diagram of a simplified computing device capable of being used with the methods and systems herein according to one embodiment.

In FIG. 7, device 710 includes a processor 720 and a communications subsystem 730, where the processor 720 and communications subsystem 730 cooperate to perform the methods of the embodiments described above. Communications subsystem 720 may, in some embodiments, comprise multiple subsystems, for example for different radio technologies.

Processor 720 is configured to execute programmable logic, which may be stored, along with data, on device 710, and shown in the example of FIG. 7 as memory 740. Memory 740 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 740, device 710 may access data or programmable logic from an external storage medium, for example through communications subsystem 730.

Communications subsystem 730 allows device 710 to communicate with other devices or network elements and may vary based on the type of communication being performed. Further, communications subsystem 730 may comprise a plurality of communications technologies, including any wired or wireless communications technology.

Communications between the various elements of device 710 may be through an internal bus 760 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device in a public ledger cryptography system, the method comprising:
creating a purpose string, the purpose string defining transaction parameters for an account within the public ledger cryptography system;
creating a private key and associated public key for an account within the public ledger cryptography system, the creating using the purpose string, wherein the public key is uniquely bound to the purpose string;
receiving a request from a second computing device in the public ledger cryptography system for the purpose string; and
providing the purpose string to the second computing device for use in proof of generation verification of the public key during a transaction from the account within the public ledger cryptography system.

2. The method of claim 1, wherein the purpose string defines at least one parameter selected from: a transaction value limit; a transaction frequency limit; a transaction geography limit; a transaction time period limit; a transaction location limit; a limit on a location of an account holder of the account within the public ledger cryptography system relative to a recipient during the transaction; and a limit on goods or services permitted in a transaction.

3. The method of claim 1, wherein the purpose string provides an identifier for an account holder of the account within the public ledger cryptography system.

4. The method of claim 3, wherein the identifier is biometric data for of the account holder.

5. The method of claim 3, wherein the identifier is a name of the account holder.

6. The method of claim 3, wherein the identifier is an image of a document for the account holder.

7. The method of claim 1, wherein the providing is performed based on a request from a recipient in the transaction.

8. The method of claim 1, wherein the providing is performed on account creation with a network element.

9. The method of claim 8, wherein the network element is associated with the public ledger cryptography system.

10. A computing device in a public ledger cryptography system, the computing device comprising:
a processor; and
a communications subsystem,
wherein the computing device is configured to:
create a purpose string, the purpose string defining transaction parameters for an account within the public ledger cryptography system;
create a private key and associated public key for an account within the public ledger cryptography system, the creation using the purpose string, wherein the public key is uniquely bound to the purpose string;
receive a request from a second computing device in the public ledger cryptography system for the purpose string; and
provide the purpose string to the second computing device for use in proof of generation verification of the public key during a transaction from the account within the public ledger cryptography system.

11. The computing device of claim 10, wherein the purpose string defines at least one parameter selected from: a transaction value limit; a transaction frequency limit; a transaction geography limit; a transaction time period limit; a transaction location limit; a limit on a location of an account holder of the account within the public ledger cryptography system relative to a recipient during the transaction; and a limit on goods or services permitted in a transaction.

12. The computing device of claim 10, wherein the purpose string provides an identifier for an account holder of the account within the public ledger cryptography system.

13. The computing device of claim 12, wherein the identifier is biometric data for of the account holder.

14. The computing device of claim 12, wherein the identifier is a name of the account holder.

15. The computing device of claim 12, wherein the identifier is an image of a document for the account holder.

16. The computing device of claim 10, wherein the computing device is configured to provide based on a request from a recipient in the transaction.

17. The computing device of claim 10, wherein the computing device is configured to provide on account creation with a network element.

18. The computing device of claim 17, wherein the network element is associated with the public ledger cryptography system.

19. A non-transitory computer readable medium for storing instruction code which, when executed by a processor of a computing device in a public ledger cryptography system, cause the computing device to:
   create a purpose string, the purpose string defining transaction parameters for an account within the public ledger cryptography system;
   create a private key and associated public key for an account within the public ledger cryptography system, the creation using the purpose string, wherein the public key is uniquely bound to the purpose string;
   receive a request from a second computing device in the public ledger cryptography system for the purpose string; and
   provide the purpose string to the second computing device for use in proof of generation verification of the public key during a transaction from the account within the public ledger cryptography system.

* * * * *